United States Patent
Jung

(10) Patent No.: US 8,036,154 B2
(45) Date of Patent: Oct. 11, 2011

(54) DEVICE AND METHOD FOR SAVING POWER IN DIGITAL BROADCASTING RECEIVER

(75) Inventor: Boo Sup Jung, Cheonan-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 187 days.

(21) Appl. No.: 12/327,695

(22) Filed: Dec. 3, 2008

(65) Prior Publication Data
US 2009/0153746 A1    Jun. 18, 2009

(30) Foreign Application Priority Data
Dec. 18, 2007 (KR) .................. 10-2007-0133644

(51) Int. Cl.
*G08C 17/00* (2006.01)
(52) U.S. Cl. ........ 370/311; 370/329; 370/431; 370/503; 345/730; 455/452.1; 455/522; 455/572

(58) Field of Classification Search ................. None
See application file for complete search history.

(56) References Cited

U.S. PATENT DOCUMENTS

| 7,509,150 B1* | 3/2009 | Simmons ................ 455/574 |
| 2006/0225109 A1* | 10/2006 | Seo ................. 725/100 |
| 2006/0236356 A1* | 10/2006 | Takagi et al. ................ 725/100 |
| 2008/0056200 A1* | 3/2008 | Johnson ................. 370/333 |
| 2008/0212688 A1* | 9/2008 | Aue ................. 375/240.26 |
| 2009/0086825 A1* | 4/2009 | Jung ................. 375/240.26 |
| 2009/0254961 A1* | 10/2009 | Aue ................. 725/116 |

* cited by examiner

*Primary Examiner* — Chi H Pham
*Assistant Examiner* — Shick Hom
(74) *Attorney, Agent, or Firm* — Jefferson IP Law, LLP

(57) ABSTRACT

A device and a method are provided for saving electric power consumed in a digital broadcasting receiver. The device and method includes acquiring information regarding a transmission order of all service channels, calculating a delay relationship between an arbitrarily played service channel and a service channel for switching, and enabling a broadcast receiving unit when the service channel for switching is received.

19 Claims, 10 Drawing Sheets

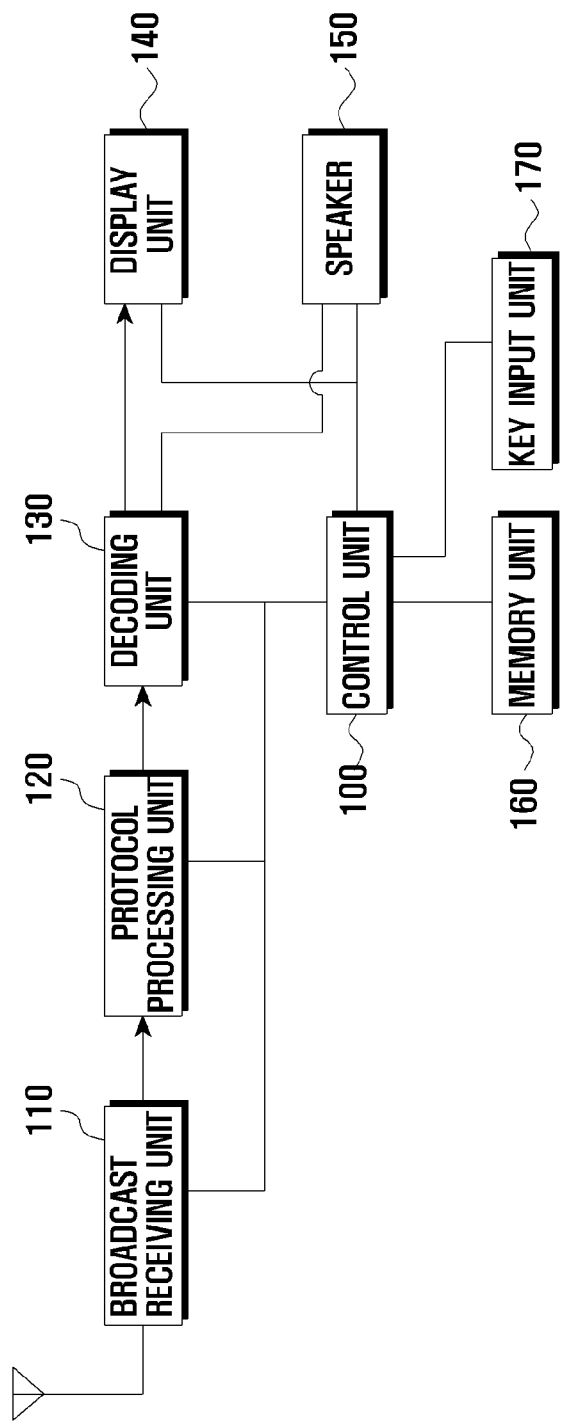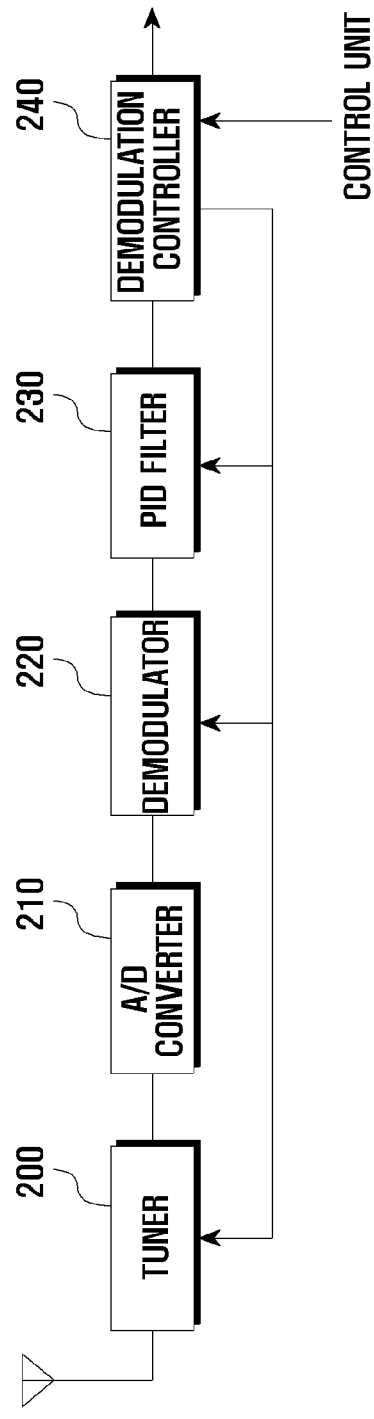

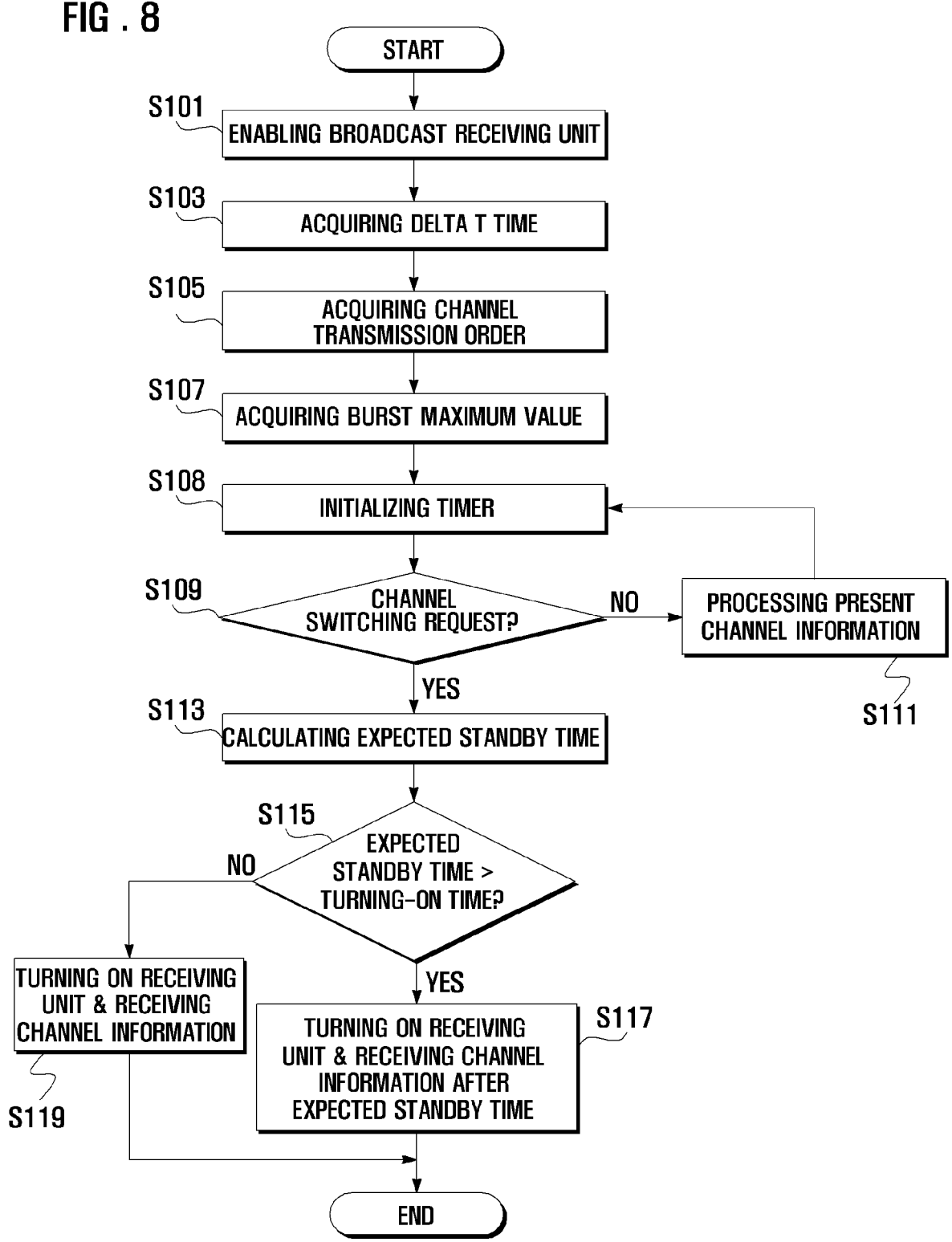

DEVICE AND METHOD FOR SAVING POWER IN DIGITAL BROADCASTING RECEIVER

PRIORITY

This application claims the benefit under 35 U.S.C. §119(a) of a Korean patent application filed in the Korean Intellectual Property Office on Dec. 18, 2007 and assigned Serial No. 10-2007-0133644, the entire disclosure of which is hereby incorporated by reference.

BACKGROUND OF THE INVENTION

1. Field of the Invention

The present invention relates to a digital broadcasting receiver. More particularly, the present invention relates to a device and a method for saving power in a digital broadcasting receiver by turning on the receiver when a channel selected through channel switching is received.

2. Description of the Related Art

Currently a digital broadcasting receiver performs functions of receiving and displaying a variety of digital broadcasting signals. The digital broadcasting receiver comprises a tuner, a broadcast data demodulator and a broadcast data decoder. As the digital broadcasting receiver receives the digital broadcasting signals, which are encoded and modulated, the received digital broadcasting signals are demodulated and decoded.

A digital broadcasting system includes Digital Multimedia Broadcasting (DMB) system and Digital Video Broadcasting (DVB) system. In general, digital broadcasting provides several service channels through a single frequency channel. The service channels may transmit broadcast data and/or additive broadcast information regarding channels for sending digital broadcast signals that a broadcasting station offers.

In a Digital Video Broadcasting-Handheld (DVB-H) digital broadcasting receiver applied to a mobile terminal, broadcast data comprises audio/video data and additive broadcast information data. Here, audio/video data uses a Real Time Transport Protocol (RTP) suitable for real-time transmission. Additive broadcast information data uses a File Delivery over Unidirectional Transport (FLUTE) protocol suitable for high-capacity file transmission. The FLUTE protocol is formed of Asynchronous Layered Coding (ALC) including Layered Coding Transport (LCT), and FLUTE data has a File Delivery Table (FDT) and object data.

The DVB-H digital broadcasting receiver is supplied with limited power to enhance the receiver's mobility. That is, a mobile digital broadcasting receiver uses a rechargeable battery with limited size for the purpose of making transportation easier. Therefore, it is difficult for the mobile digital broadcast receiver to operate for a long duration of time. Additionally, when a DVB-H digital broadcasting receiver has additional functions, such as a mobile communication function or file play function, for example, battery consumption becomes greater.

Therefore, a need exists for a device and method for saving power consumed in a digital broadcasting receiver.

SUMMARY OF THE INVENTION

An aspect of the present invention is to address at least the above-mentioned problems and/or disadvantages and to provide at least the advantages described below. Accordingly, an aspect of the present invention is to provide a power saving device and method that may allow a reduction in unnecessary power consumption in a digital broadcasting receiver by turning on the receiver just at a selected channel when channels are switched.

In accordance with an aspect of the present invention, a method is provided for saving power in a digital broadcasting receiver in a channel switching of N service channels repeatedly transmitted in a time slicing operation is provided. The method includes receiving and processing information regarding a K-th service channel among the service channels by enabling a broadcast receiving unit, wherein K and N are natural numbers and K is smaller than N, acquiring information regarding a transmission order of the N service channels; determining the order of an M-th service channel for switching from the K-th service channel when channel switching is requested, wherein M is a natural number smaller than N, and performing channel switching by enabling the broadcast receiving unit in the order of the M-th service channel and then receiving and processing information about the M-th service channel.

In accordance with another aspect of the present invention, a system is provided for saving power in a digital broadcasting receiver is provided. The system includes a broadcast receiving unit for repeatedly receiving and processing information regarding a K-th service channel among N service channels in a time slicing operation, wherein K and N are natural numbers and K is smaller than N, a key input unit for transferring a request for channel switching to an M-th service channel, wherein M is a natural number smaller than N, and a control unit for acquiring information regarding the transmission order of the N service channels, determining the order of the M-th service channel from the K-th service channel when the channel switching is requested and enabling the broadcast receiving unit when the M-th service channel is received.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1 is a block diagram showing a digital broadcasting receiver in accordance with an exemplary embodiment of the present invention.

FIG. 2 is a block diagram showing a broadcast receiving unit in accordance with an exemplary embodiment of the present invention.

FIG. 8 is a flow diagram showing a method for saving power in a digital broadcasting receiver in accordance with an exemplary embodiment of the present invention.

Throughout the drawings, it should be noted that like reference numbers are used to depict the same or similar elements, features and structures.

DETAILED DESCRIPTION OF THE EXEMPLARY EMBODIMENTS

Figure 3:
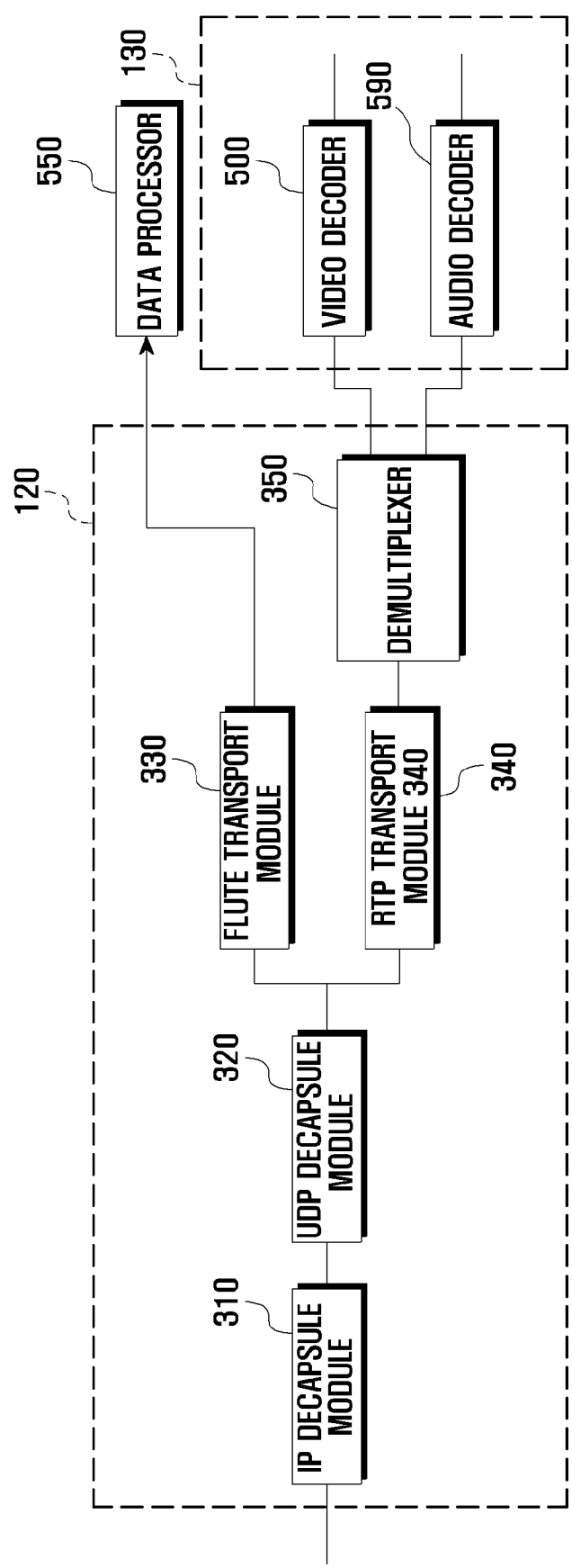
FIG. 3 is a block diagram showing a protocol processing unit in accordance with an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 is a block diagram showing a digital broadcasting receiver of a DVB-H system in accordance with an exemplary embodiment of the present invention.

Referring to FIG. 1, a control unit 100 controls an overall operation of the digital broadcasting receiver. A key input unit 170 creates key data depending on a user's selection and transmits the key data to the control unit 100. Here, a user's commands input through the key input unit 170 may include a menu selection or a hot key for enabling the digital broadcasting receiver, and an instruction for updating additive broadcast information, if necessary. The updating instruction of additive broadcast information is generally created in a specific cycle and at an initiation time of the receiver. The updating instruction of the additive broadcast information may occur by a user's command input through the key input unit 170. A memory unit 160 may comprise a program memory that stores programs for controlling the operation of the digital broadcasting receiver and a data memory for storing data produced during an operation of the programs. The data memory of the memory unit 160 may store an order of broadcast channels that is time-sliced according to an exemplary embodiment of the present invention, and the time (i.e., ΔT time) when broadcast channel information is entirely transmitted.

A broadcast receiving unit 110 receives, under control of the control unit 100, data of service channels selected by a user. A protocol processing unit 120 processes a data protocol of the service channels and separates video data, audio data and additive broadcast information data for output. A decoding unit 130 includes an audio decoder, a video decoder and a data processor. The audio decoder decodes and outputs encoded audio data of a main service channel. The video decoder decodes and outputs encoded video data of the main service channel. The decoded audio data and decoded video data are transmitted and reproduced in a speaker 150 and display unit 140, respectively. The data processor decodes additive broadcast information data, determines a need to update the decoded additive broadcast information and performs an updating process.

FIG. 2 is a block diagram showing an exemplary broadcast receiving unit and FIG. 3 is a block diagram showing an exemplary protocol processing unit. FIGS. 4A to 4F are views showing structures of IP-based service channel data received by the digital broadcasting receiver of a DVB-H system in accordance with an exemplary embodiment of the present invention. FIG. 5 is a view showing a method of processing burst data of service channels selected through a time slicing operation in accordance with an exemplary embodiment of the present invention.

Figure 4A:
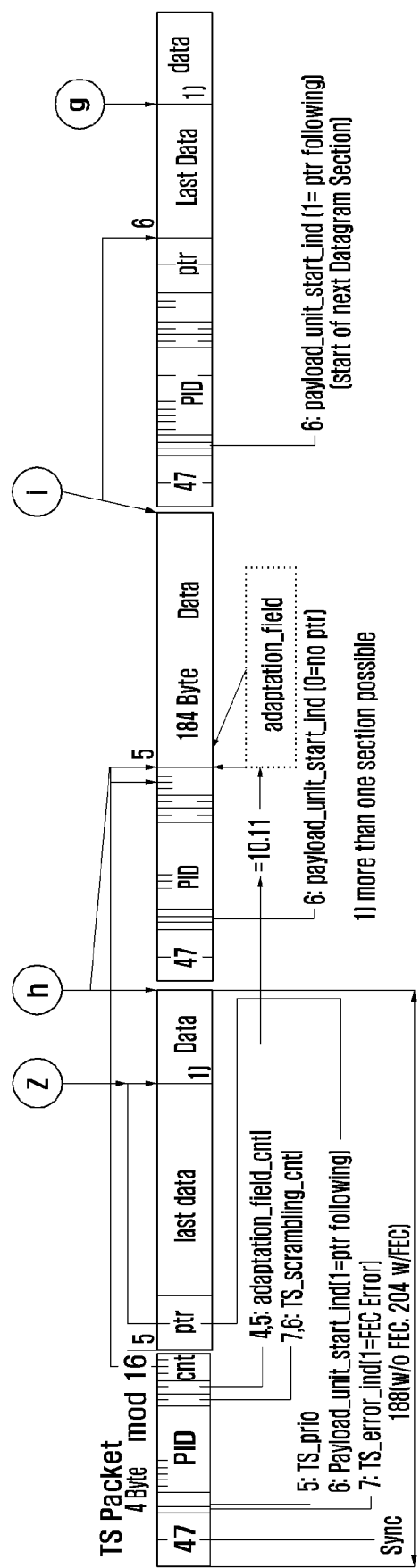
FIGS. 4A to 4F are views showing structures of IP-based service channel data received by a digital broadcasting receiver in accordance with an exemplary embodiment of the present invention.
Figure 4B:
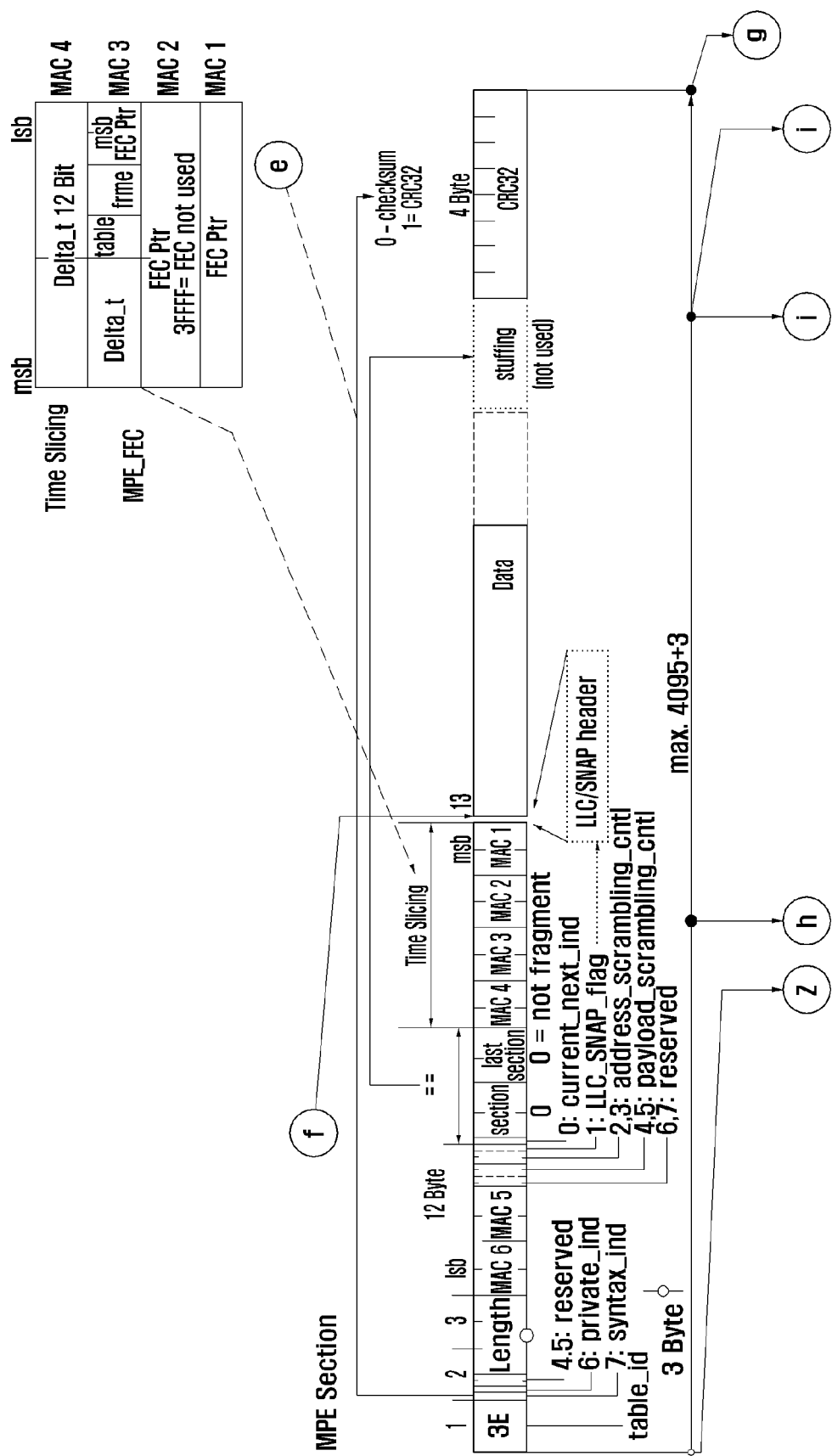
Figure 4C:
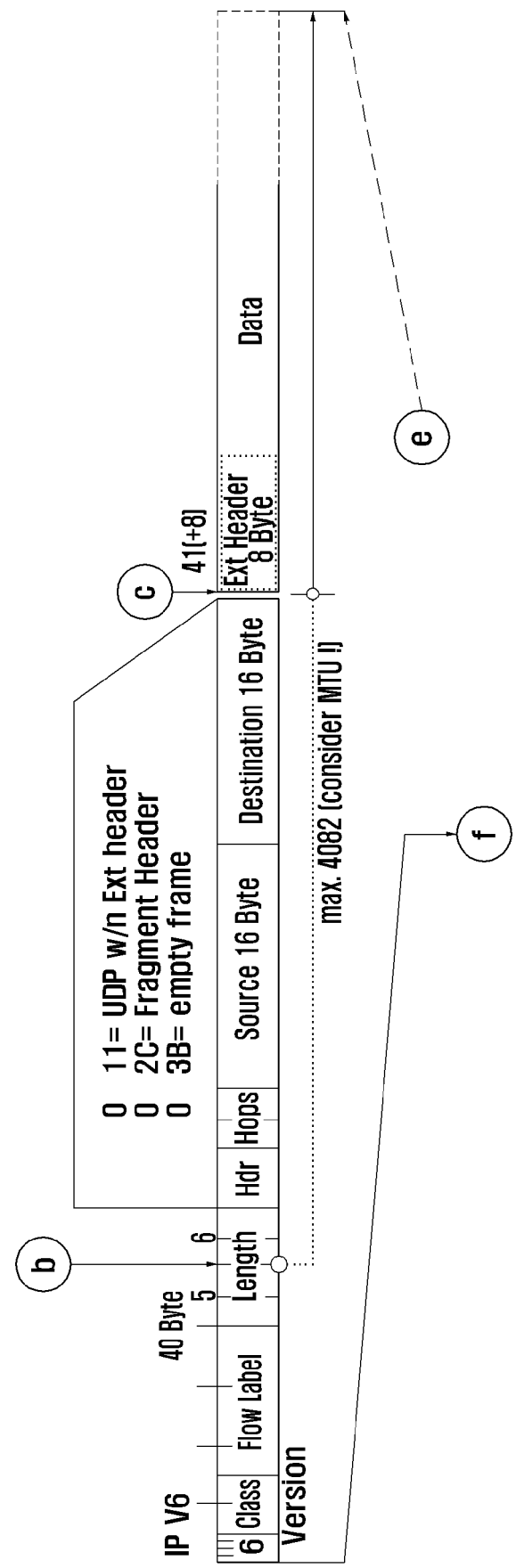
Figure 4D:
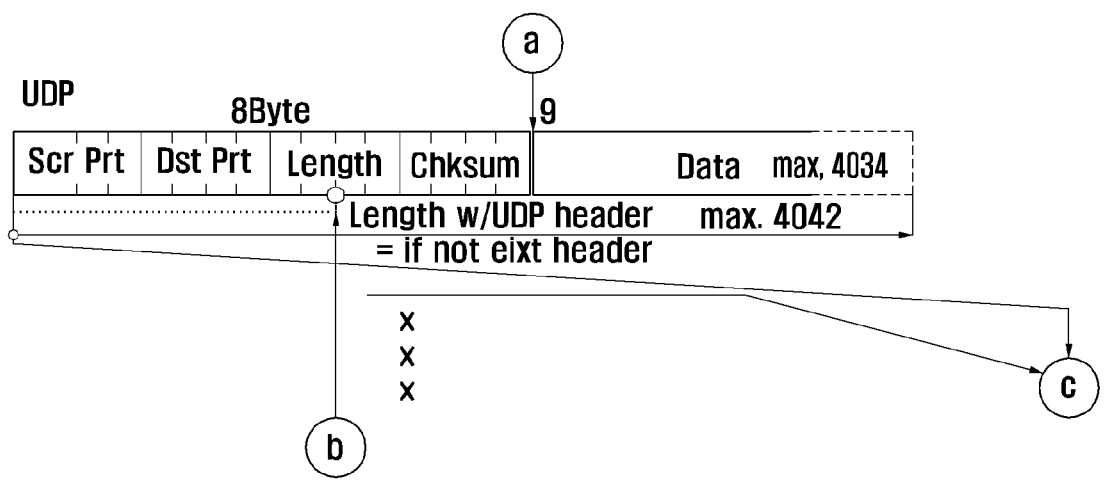
Figure 4E:
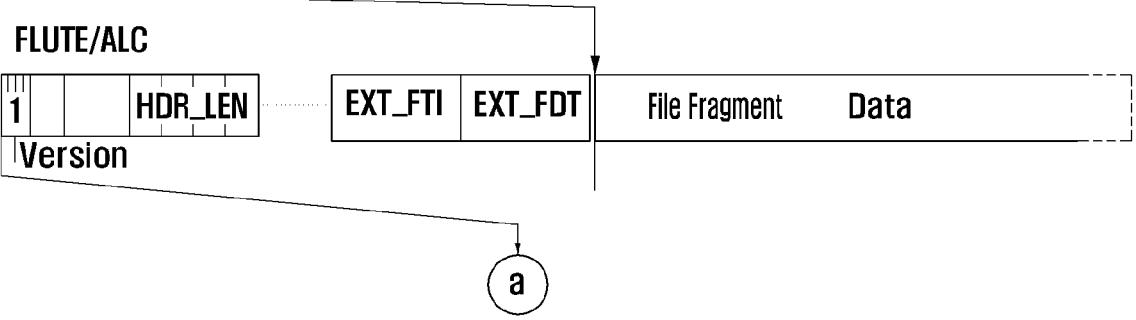
Figure 4F:
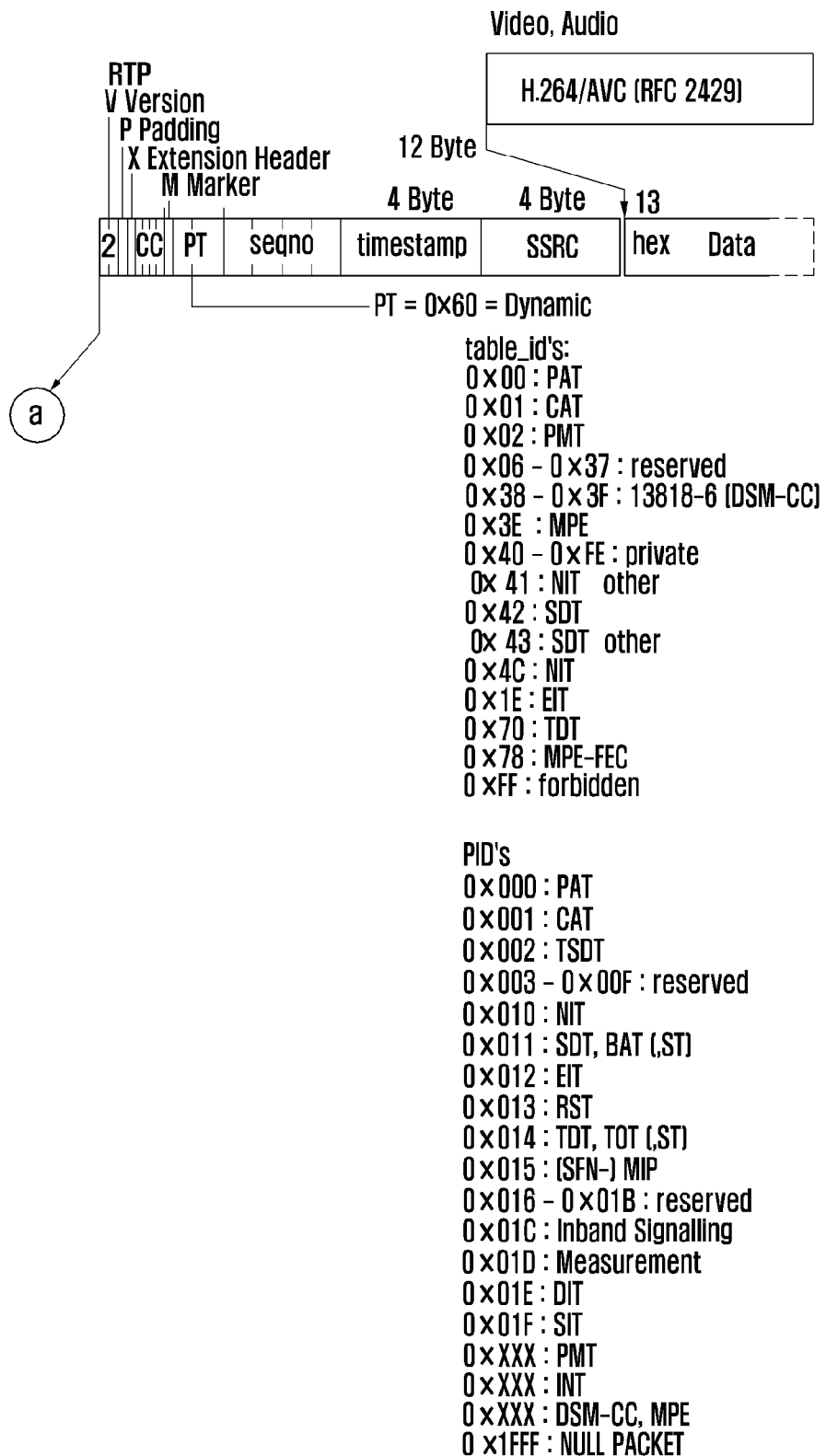
Figure 5:
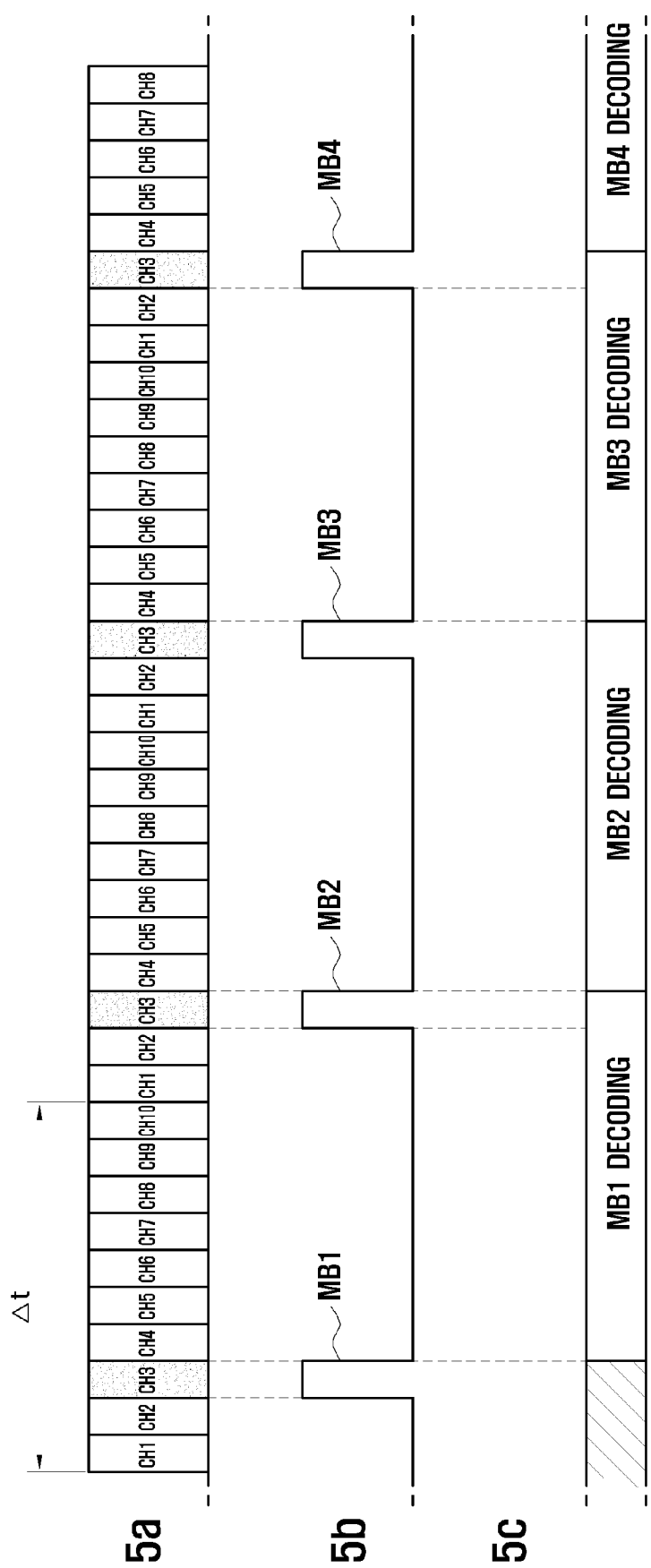
FIG. 5 is a view showing a method of processing burst data of service channels selected through a time slicing technique in accordance with an exemplary embodiment of the present invention.

Referring to FIGS. 4A to 4F, which show DVB-H data mapping configurations, the DVB-H data has a Moving Picture Experts Group 2-Transport Stream (MPEG2-TS) structure. A TS packet shown in FIG. 4A has a size of 188 bytes and may comprise a packet header of 4 bytes and a payload of 184 bytes. The packet header has packet sync information and Packet Identifier (PID) information. The PID information may be used as information for identifying service channels and identifying a payload. FIG. 4B shows a structure of an MPE section that may be recorded in a payload shown in FIG. 4A. The MPE section information may include table identification (MPE_ID), information for correcting errors of received data (Multi-Protocol Encapsulation-Forward Error Correction (MPE_FEC)) and information for time-slicing received data. FIG. 4C shows an IP datagram structure in case of IPv6. The IP datagram includes an IP version (IPv6, IPv4, etc.), a source IP address and a destination IP address. FIG. 4D shows a User Datagram Protocol (UDP) including information regarding a source port and destination port (Scr Prt, Dst Prt). FIG. 4E shows a FLUTE/ALC structure including an Electronic Service Guide (ESG) and files. FIG. 4F shows an RTP structure including audio data and video data.

File transmission of the DVB-H is made through a FLUTE protocol. A file received through the FLUTE protocol comprises ALC(RFC3450)/LCT(RFC3451) building blocks. Actual data transmission is made through these building blocks. The data transmission may be encoded using Binary for Meta-data (BiM) or GNU Zip (GZIP(RFC1952)), which are types of compression, or may be encoded as an uncompressed file such as a File Description Table (FDT) file, a Session Description Protocol (SDP) file, an ESG file, a video file, an image file, a text file, a short video clip file, etc. Among the files, the FDT file stores information regarding all files transmitted through the FLUTE protocol.

Specifically, the FDT includes main information of an object file to be used, including information regarding Transport Object Identifier (TOI), object length, object location, object type, object packet number, etc. When receiving a FLUTE protocol file, the digital broadcasting receiver confirms data and receives packets according to information created through the FDT.

Referring to FIG. 5 showing a method for time slicing and decoding of video data, the DVB-H allows transmission of several service channels through a single physical channel. All service channels are arranged in time order and multiplexed as indicated by 5a in FIG. 5. For example, ten service channels (ch1~ch10) in a single physical channel, as indicated by 5a, and a third service channel (ch3) are selected. A single section of ten service channels (ch1~ch10) is designated Δt. A burst in the third service channel (ch3) is turned on and bursts in the other service channels are turned off. In FIG. 5, as indicated by 5b, the DVB-H selectively supplies power so that the broadcast receiving unit 110 may only operate at a specific service channel (ch3, for example) selected by using the time slicing operation. As indicated by 5c in FIG. 5, burst data of the selected service channel is decoded in a Δt section. Specifically, the digital broadcasting receiver, according to an exemplary embodiment of the present invention, decodes data of a service channel in a Δt section and then displays the decoded data on the display unit 140.

Referring to FIG. 2, a demodulation controller 240 sets a physical channel frequency of a selected service channel by controlling a tuner 200 through channel control data output from the control unit 100 and sets the PID of service channels selected at a PID filter 230. By analyzing PSI/SI information output from the broadcast receiving unit 110 and SDP information included in the ESG output from the protocol processing unit 120, the control unit 100 confirms PID, IP and port information of service channels selected by a user. When a user selects a service channel, the control unit 100 outputs channel data for filtering the PID information of a service channel and a physical channel transmitting service channel data selected at the demodulation controller 240.

The demodulation controller 240 then establishes frequency of a physical channel, which receives a service channel selected at the tuner 200 and establishes the PID information of the selected service channel to the PID filter 230. Then the tuner 200 receives broadcast signals at an established frequency of a physical channel. An A/D converter 210 converts output signals from the tuner 200 into digital data and a demodulator 220 demodulates modulated broadcast signals into original data. Here, the demodulator 220 may be an OFDM or COFDM demodulator. Data demodulated by the demodulator 220 may be a TS packet stream of MPEG2-TS as shown in FIG. 4A, wherein the TS packet includes PID information for identifying service channels. The PID filter 230 filters data that has the PID information of a service channel selected in a demodulated IP datagram. The PSI/SI information is then transferred to the control unit 100. The TS data output from the PID filter 230 may include Multi-Protocol Encapsulation-Forward Error Correction (MPE-FEC) and time slicing information as shown in FIG. 4B. If the TS packet comprises data information as shown in FIG. 4B, the demodulation controller 240 performs a time slicing control for burst data being received. Specifically, the demodulation controller 240 controls a power supply to the tuner 200 and the demodulator 220 by using time slicing information. Here, time slicing information includes burst-on-time information of the selected and buffering service channel. By using the time slicing information, the demodulation controller 240 supplies power to the tuner 200 and the demodulator 220 in a burst data section of the selected service channel, and suspends power supply in other sections of the broadcast receiving unit. Additionally, by using MPE section information as shown in FIG. 4B, the demodulation controller 240 performs an MPE-FEC function of data in the selected and buffering service channel output from the PID filter 230. The MPE-FEC function adds additive information (i.e., redundancy) by FEC-encoding the FLUTE protocol file transmitted according to the FLUTE protocol. When the FEC-encoded FLUTE protocol file is received, FEC-decoding determines whether the entire file is properly received.

As discussed above, the demodulation controller 240 sets a physical channel frequency of a selected service channel by controlling the tuner 200 through channel control data output from the control unit 100 and sets the PID information of service channels selected at the PID filter 230. Using MPE section information, as shown in FIG. 4B, the demodulation controller 240 controls the time slicing operation for reducing power consumption of the digital broadcasting receiver. Additionally, the demodulation controller 240 performs the MPE-FEC function for improving a receiving rate by correcting errors. Here, data output from the demodulation controller 240 may be an IP datagram structure as shown in FIG. 4C.

FIG. 3 shows a configuration of the protocol processing unit 120 in the digital broadcasting receiver of a DVB-H system.

Referring to FIG. 3, the protocol processing unit 120 processes IP and protocol information data of the selected service channel and then extracts video data, audio data and additive broadcast information. In the decoding unit 130, a video decoder 500 decodes video data output from the protocol processing unit 120 and outputs the decoded data on the display unit 140. An audio decoder 590 decodes audio data output from the protocol processing unit 120 and outputs the decoded data through the speaker 150. A data processor 550 then decodes additive broadcast information, determines a need to update the additive broadcast information and performs an updating process.

The protocol processing unit 120 may be composed of an IP decapsule module 310, a UDP decapsule module 320, a FLUTE transport module 330, an RTP transport module 340 and a demultiplexer 350.

The selected service channel data, input to the IP decapsule module 310, is an IP datagram including a source IP address and destination IP address as shown in FIG. 4C. The IP decapsule module 310 decapsulates the IP datagram and extracts IP information. The UDP decapsule module 320 receives UDP information comprising a source port address and destination port address as shown in FIG. 4D, and then extracts the port information. If UDP-extracted protocol data comprises FLUTE/ALC protocol data, as shown in FIG. 4E, the UDP decapsule module 320 transmits the received data to the FLUTE transport module 330. If UDP-extracted protocol data comprises RTP protocol data, the UDP decapsule module 320 transmits the received data to the RTP transport module 340. With respect to the FLUTE/ALC protocol, the broadcast information data may be ESG or file data (XML, SDP, HTML, JPG, POL, etc.). The RTP protocol data may be audio data and video data. The RTP transport module 340 demultiplexes video data and audio data, which is RTP-processed, and then outputs the video data and audio data to the video decoder 500 and the audio decoder 590, respectively.

The control unit 100 processes protocol information processed by the protocol processing unit 120, which extracts and transports data. For example, the control unit 100 may have ESG engines (an XML engine and an ESG decoder), an SDP parser, a PSI/SI decoder, etc. The control unit 100 may use controllers and managers to process control and manage the protocol information Specifically, the control unit 100 may determine the PSI/SI according to MPEG-2 and DVB-SI standards by analyzing PSI/SI information (Network Information Table (NIT), Service Description Table (SDT), Event Information Table (EIT)) that the broadcast receiving unit 110 extracts. The control unit 100 also controls an entire operation of the digital broadcasting receiver by parsing ESG data that the protocol processing unit 120 transports. Here, service channels and audio data, video data and additive broadcast information (i.e., ESG) of each service channel may be determined by PID, IP and port information. The PSI/SI and SDP include tables for defining information regarding identifiers of service channels and identifiers of audio, video, and ESG of each service channel. Therefore, the control unit 100 may determine service channels, audio data, video data and ESG data by referring to PSI/SI decoding results and SDT. Alternatively, the control unit 100 may include the protocol processing unit 120.

After the video data and audio data are output from the protocol processing unit 120, the video decoder 500 decodes the demultiplexed video data and displays the data on the display unit 140. The audio decoder 590 decodes the demultiplexed audio data and reproduces the data at the speaker 150. Here, the video decoder 500 may employ an H.264 or MPEG series decoder, and the audio decoder 590 may employ an Advanced Audio coding (AAC) decoder.

While receiving broadcast data, configuration of the DVB-H digital broadcasting receiver, as discussed above, separates audio, video and additive broadcast information at the protocol processing unit 120 and then transports the audio, video and additive broadcast information to corresponding decoders. With respect to the FLUTE protocol files, the control unit 100 receives the FLUTE protocol files through the FLUTE transport module 340 of the protocol processing unit 120 and the data processor 550.

In order to save power during channel switching, the above-discussed digital broadcasting receiver controls the broadcast receiving unit 110 which is turned on at the burst time when a switched channel is received. As a result, the digital broadcasting receiver collects PID information filtered by the PID filter 230 and may determine the transmission order of burst time-sliced in the service channels.

If the number of time slices actually received does not exceed the filtering capability of the PID filter 230 (for example, in FIG. 5A, if the PID filter 230 may filter ten or more time slices), the PID filter 230 may filter PID data of all service channels in the demodulated IP datagram. Here, the control unit 100 may determine the channel order of service channels by collecting PID information of each service channel filtered at the PID filter 230, recording time information of the collected PID information, and arranging PID information in a collecting order. For example, in FIG. 5A, if the PID filter 230 filters the third channel (ch3), extracts PID information and transfers the PID information to the control unit 100, the control unit 100 begins operating a timer from the time the PID information is collected. Then the control unit 100 records the time when the PID information of the next channel (ch4) is collected. Similarly, by successively recording the collection time of each PID information, the control unit 100 may determine the channel transmission order of all service channels.

Alternatively, the control unit 100 may determine a time_slice_fec_identifier_descriptor included in PSI/SI information output from the PID filter 230. The time_slice_fec_identifier_descriptor defines parameters related to MPE-FEC and time slicing of a channel which forms each burst of a service channel, as shown in Table 1 below.

TABLE 1

Time Slice and FEC identifier descriptor

| Syntax | Number of bits | Identifier |
|---|---|---|
| time_slice_fec_identifier_descriptor ( ) { | | |
|   descriptor_tag | 8 | ulmsbf |
|   descriptor_length | 8 | ulmsbf |

TABLE 1-continued

Time Slice and FEC identifier descriptor

| Syntax | Number of bits | Identifier |
|---|---|---|
|   time_slicing | 1 | bslbf |
|   mpe_fec | 2 | ulmsbf |
|   reserved_for_future_use | 2 | bslbf |
|   frame_size | 3 | ulmsbf |
|   max_burst_duration | 8 | ulmsbf |
|   max_average_rate | 4 | ulmsbf |
|   time_slice_fec_id | 4 | ulmsbf |
|   for( i=0; i<N; i++ ) { | | |
|     id_selector_byte | 8 | bslbf |
|   } | | |
| } | | |

In Table 1, the time_slice_fec_identifier_descriptor defines a max_burst_duration, which is the maximum length each burst may have. The max_burst_duration may be used when the digital broadcasting receiver does not know the end of the burst due to a poor channel state. Also, max_burst_duration is used when a burst-on time of a specific service channel in a channel switching request is set.

More specifically, the control unit 100, which determines the channel transmission order of all service channels, stores a max_burst_duration value of each PID in PSI/SI analysis. Then, if channel switching occurs, the control unit 100 controls the broadcast receiving unit 110 to start operating near the burst-on time of the switching-requested channel by applying the max_burst_duration value of the switching-requested channel.

Figure 6:
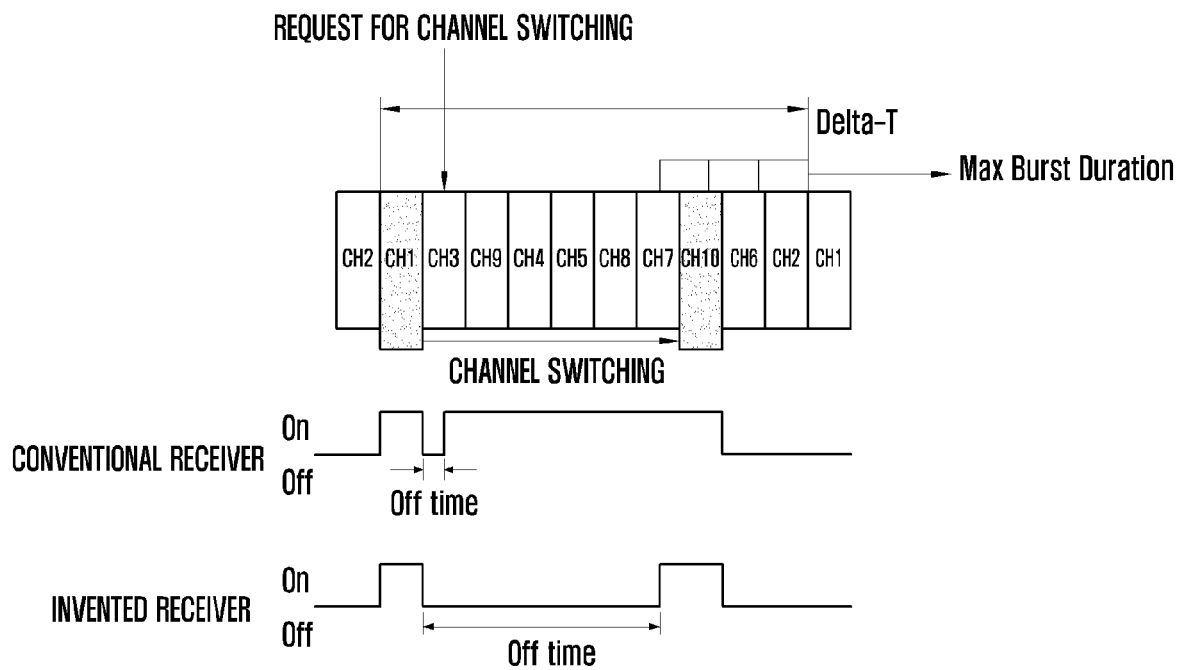
FIG. 6 is a view showing a method of determining a turn-on timing of a broadcast receiving unit according to channel switching in accordance with an exemplary embodiment of the present invention.

FIG. 6 shows time slicing for power saving in a digital broadcasting receiver in comparison with a general channel switching. In an exemplary embodiment of the present invention, ten service channels exist in the digital broadcasting receiver and the first channel is currently playing and will be switched to the tenth channel.

Referring to FIG. 6, the control unit 100 operates a timer when the first channel (channel 1) starts playing. The control unit 100 then collects PID information output from the PID filter 230. All service channels are transmitted through a single frequency in the order of channel 1, channel 3, channel 9, channel 4, channel 5, channel 8, channel 7, channel 10, channel 6 and channel 2. Also, the control unit 100 may determine the burst-on time of channel 1, depending on PSI/SI information output from the PID filter 230, so the control unit 100 may determine the entire Δt time. Based on the above information, the control unit 100 may determine the transmission order of service channels the entire Δt time. Furthermore, the control unit 100 determines the max_burst_duration corresponding to each service channel among parameters of the time_slice_fec_identifier_descriptor in the PSI/SI information.

The control unit 100 maintains a turn-off state in the broadcast receiving unit 120 after channel 1 is played. If a request for channel switching to channel 10 is input, the control unit 100 turns on the broadcast receiving unit 110 at a time corresponding to channel 10 and receives related information. By applying the max_burst_duration, the control unit 100 turns on the broadcast receiving unit 110 before channel 10 is received.

Accordingly, if a request for channel switching to channel 10 occurs when channel 3 is received next after channel 1, the control unit 100 may turn on the broadcast receiving unit 110 only at the time for receiving channel 10 without successively turning on any channels after channel 3 and before channel 10.

Alternatively, if a request for channel switching occurs during a channel play, the control unit 100 determines an expected standby time. The expected standby time may be determined by subtracting, from the entire Δt time, a timer value at a time when channel switching is requested, and further subtracting a max_burst_duration of both channel 6 and channel 2 after the switched channel 10, in the order of burst transmission. The control unit 100 then compares the expected standby time with a time necessary for turning on the broadcast receiving unit 110. If the expected standby time is smaller, the control unit 100 may immediately turn on the broadcast receiving unit 110 to search a channel after switching. If the expected standby time is greater, the control unit 100 turns on the broadcast receiving unit 110 at the time for searching a channel after switching with consideration of a time necessary for turning on the broadcast receiving unit 110.

Figure 7:
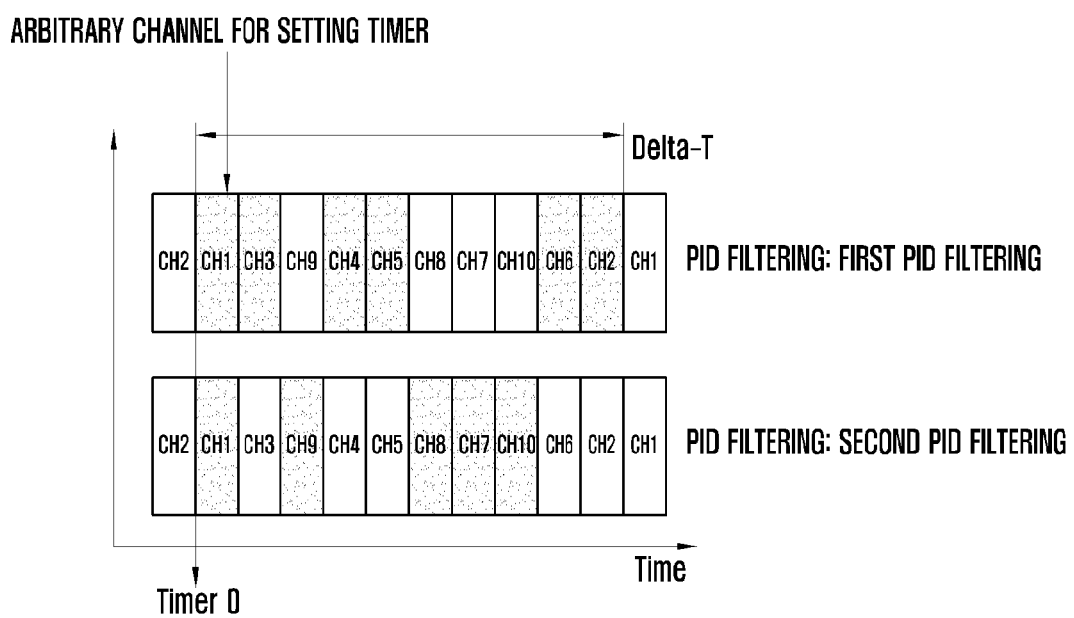
FIG. 7 is a view showing a method of performing PID filtering according to a PID filter filtering capability in accordance with an exemplary embodiment of the present invention.

FIG. 7 is a view showing a method of detecting the order of service channel transmission in accordance with an exemplary embodiment of the present invention, when the PID filter 230 does not filter all service channels (for example, only six service channels among ten may be filtered).

Referring to FIG. 7, since the filtering capability of the PID filter 230 is smaller than the number of all service channels, the control unit 100 arbitrarily filters six PIDs before the other PIDs. At this time, the control unit 100 may determine a specific channel for a standard timer. For example, if the specific channel is channel 1, the control unit 100 may calculate a Δt time based on channel 1 through the MPE section information of channel 1. The control section may also set a timer to "0" when channel 1 is received. The control unit 100 then turns on the broadcast receiving unit 110 for a Δt time and stores each PID number and receiving time whenever PID filtering in the service channels is received. When each PID number is stored, the time duration may range from zero to Δt. The control unit 100 then filters PID numbers corresponding to a remaining four service channels. By filtering the PID number corresponding to channel 1 again, the control unit 100 may obtain the standard time, namely, a time when a timer becomes "0". If four PID numbers and their receiving times are obtained based on the standard time, the control unit 100 may determine the channel transmission order of all service channels by combining the channel transmission order with pre-stored six PID numbers and time information.

As time passes, values of the timer may vary due to an inherent delay in normal wireless channels. In an exemplary embodiment of the present invention, the control unit 100 sets the timer to "0" at every Δt time or at intervals of predefined Δt time in case where an initially appointed channel is maintained without a channel switching request.

Hereinafter, a method for saving power in the digital broadcasting receiver will be described.

FIG. 8 is a flow diagram showing a power saving method for the digital broadcasting receiver in accordance with an exemplary embodiment of the present invention.

Referring to FIG. 8, if electric power is supplied to the digital broadcasting receiver, the control unit 100 of the digital broadcasting receiver enables the broadcast receiving unit 110 in step S101.

The broadcast receiving unit 110 then receives data of a service channel selected by a user under the control of the control unit 100 and outputs PSI/SI information and MPE section information to the control unit 100 by using the PID filter 230. The control unit 100 may control receiving, decoding, encoding and outputting information of a specific service channel determined as default or preset by a user.

Then, in step S103, the control unit 100 acquires a Δt time based on a specific channel depending on PSI/SI information output from the PID filter 230. The specific service channel may be preset by a user or alternatively selected as a default mode.

Additionally, in step S105, the control unit 100 acquires information regarding channel transmission order of all service channels by controlling the PID filter 230. Accordingly, the control unit 100 selects a specific service channel and then operates a timer at the selected service channel. The control unit 100 then records receiving times and numbers of PID information output from the PID filter 230. Thereby, information regarding the channel transmission order of all service channels is acquired. If the filtering capability of the PID filter 230 is smaller than the number of all service channels, the control unit 100 performs filtering for some service channels arbitrarily selected among all service channels. The control unit 100 again performs filtering for the other service channels to acquire information regarding the channel transmission order. By using PID number information and PID receiving time information based on the timer, the control unit 100 may obtain the channel transmission order of all service channels.

Next, in step S107, by using PSI/SI information output from the PID filter 230, the control unit 100 stores information regarding a max_burst_duration among parameters in PID information of each service channel.

The above-discussed steps of S103, S105 and S107 may be performed regardless of their order.

After information in steps S103, S105 and S107 is acquired, in step S108, the control unit 100 sets the timer to be initialized at a time when information regarding a specific channel is received. Then, in step S109, the control unit 100 determines whether a channel switching request occurs. If there is no request for channel switching, the control unit 100 controls processing and outputting information regarding a presently selected channel, in step S111. Thereafter, the control unit 100 returns to step S108 and initializes the timer to "0" according to Δt cycle of a specific channel. Since a delay may occur in data transmission due to normal wireless channels, the timer is initialized according to the Δt cycle of the specific channel. Accordingly, errors are removed when searching a channel after switching.

If there is a request for channel switching in step S109, the control unit 100 acquires a PID number of a service channel after switching and determines an expected standby time, in step S113. The expected standby time refers to a value that is obtained by subtracting, from the Δt time, a timer value at the time when channel switching is requested and also subtracts the sum of PID max_burst_duration from a channel following a channel after switching to a channel before switching in the channel transmission order.

Next, in step S115, the control unit 100 compares the expected standby time with a time necessary for turning on the broadcast receiving unit 110. If the expected standby time is greater, in step S117 the control unit 100 stands by for the expected standby time. The control unit 100 then turns on the broadcast receiving unit 110 at a proper time for receiving a channel after switching and controls receiving information regarding a channel after switching. If the expected standby time is smaller, in step S119 the control unit 100 immediately turns on the broadcast receiving unit 110 and controls receiving information regarding a channel after switching.

A time necessary for turning on (i.e., enabling) the broadcast receiving unit 110 may be from several milliseconds to several hundreds of milliseconds. An interval of burst time may be several hundreds of milliseconds. Therefore, if the expected standby time overlaps a time for turning on the broadcast receiving unit 110, the broadcast receiving unit 110 may be turned on immediately using rapid channel switching to promptly receive and process information regarding corresponding service channel. Although the broadcast receiving unit 110 does not completely receive the entire data, rapid channel switching may be used to immediately output some of the received data.

To generalize the above-discussed method for power saving, when characters N, K and M are natural numbers, and when K and M are different from each other and smaller than N, it is assumed that N service channels are repeatedly transmitted in a time slicing operation. Here, after enabling the broadcast receiving unit 110, the control unit 100 receives and processes information regarding the K-th service channel among all the service channels. Then the control unit 100 acquires information regarding the transmission order of N service channels. If channel switching is requested, the control unit 100 determines the order of the M-th service channel for switching from the K-th service channel. Then the control unit 100 enables the broadcast receiving unit 110 at a turn of the M-th service channel and then receives and processes information regarding the M-th service channel. Therefore, it is possible to optimize an enabling timing of the broadcast receiving unit in channel switching. If each burst time of N service channels is fixed or uniform, the device and method of an exemplary embodiment of the present invention may decide a receiving timing of the M-th service channel after the K-th service channel by using only the positional relation of orders. However, if each burst time is different from each other, acquisition of Δt time in which all the service channels are transmitted and a receiving timing of the M-th service channel after the K-th service channel are required.

For this, the control unit 100 acquires Δt time for transmission of N service channels from PSI/SI information included in service channels, and operates the timer when information regarding the K-th service channel is received. Thereby, the control unit 100 may obtain in advance information regarding a delay time of each service channel from the K-th service channel. When channel switching to the M-th service channel is requested, the control unit 100 may determine the expected standby time by using time information, such as Δt time, a request time for channel switching and a max_burst_duration. The control unit 100 then compares the expected standby time with a turning on time of the broadcast receiving unit 110 and controls turning on the broadcast receiving unit 110 after or before the expected standby time. Here, if the expected standby time is smaller than the turning on time of the broadcast receiving unit 110, the control unit 100 may receive data of some burst on sections only in an actual service channel in consideration of a time necessary for enabling the broadcast receiving unit 110. In an exemplary embodiment of the present invention, rapid channel switching may be used to decode, process, and output the received data only.

As discussed above, the device and the method in the digital broadcasting receiver according to exemplary embodiments of the present invention turns on the broadcast receiving unit when a channel is received after switching. Thereby, electric power consumed in the digital broadcasting receiver is saved.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for saving power in a digital broadcasting receiver in channel switching of N service channels repeatedly transmitted in a time slicing operation, the method comprising:
   receiving and processing information regarding a K-th service channel among the service channels by turning on a broadcast receiving unit, wherein K and N are natural numbers and K is smaller than N;
   turning off the broadcast receiving unit after processing the information regarding the K-th service channel;
   acquiring information regarding a transmission order of the N service channels;
   receiving a request for channel switching from the K-th service channel to an M-th service channel;
   determining the order of the M-th service channel for switching from the K-th service channel when channel switching is requested, wherein M is a natural number smaller than N; and
   performing channel switching by turning on the broadcast receiving unit in the order of the M-th service channel and then receiving and processing information about the M-th service channel.

2. The method of claim 1, wherein the acquiring of the information comprises:
   operating a timer when the K-th service channel is received;
   collecting Packet Identifier (PID) information of the service channels and a PID receiving time of each PID information, wherein the service channels are after the K-th service channel and before the next K-th service channel; and
   determining the transmission order of the N service channels by using the PID information and the PID receiving time.

3. The method of claim 2, wherein the determining of the order of the M-th service channel comprises determining the order of the M-th service channel from the K-th service channel by comparing the PID information of the M-th service channel with the PID information of other service channels.

4. The method of claim 3, wherein the determining of the order of the M-th service channel comprises acquiring a PID receiving time of the M-th service channel from the K-th service channel by comparing the PID information of the M-th service channel with the PID information and the PID receiving time of other service channels.

5. The method of claim 4, wherein the acquiring of the PID receiving time of the M-th service channel comprises:
   initializing the timer when information of the K-th service channel is received; and
   acquiring a receiving time of the M-th service channel to be received after channel switching is request, by comparing a time of the timer when the channel switching is requested with the PID receiving time of the M-th service channel.

6. The method of claim 5, wherein the acquiring of the PID receiving time of the M-th service channel comprises:
   acquiring Δt time for a single transmission of the N service channels from additive information included in the service channels;
   acquiring a burst maximum value of each service channel from the additive information; and
   determining an expected standby time for turning on the broadcast receiving unit by subtracting time information when the channel switching is requested and time information corresponding to the burst maximum value of the N-th service channel after the M-th service channel from the Δt time.

7. The method of claim 6, further comprising
initializing the timer at every Δt time of the K-th service channel before the channel switching is requested.

8. The method of claim 6, wherein the performing of the channel switching comprises:
comparing the expected standby time with a turning on time of the broadcast receiving unit; and
if the expected standby time is greater than the turning on time of the broadcast receiving unit, turning on the broadcast receiving unit after the expected standby time.

9. The method of claim 6, wherein the performing of the channel switching comprises:
comparing the expected standby time with a turning on time of the broadcast receiving unit; and
if the expected standby time is smaller than the turning on time of the broadcast receiving unit, turning on the broadcast receiving unit when the M-th service channel is received.

10. A system for saving power in a digital broadcasting receiver, the system comprising:
a broadcast receiving unit for repeatedly receiving and processing information regarding a K-th service channel among N service channels in a time slicing operation, wherein K and N are natural numbers and K is smaller than N;
a key input unit for transferring a request for channel switching to an M-th service channel, wherein M is a natural number smaller than N; and
a control unit for acquiring information regarding the transmission order of the N service channels, determining the order of the M-th service channel from the K-th service channel when the channel switching is requested and controlling the broadcast receiving unit to be turned off after the broadcast receiving unit processes the information regarding the K-th service channel and the broadcast receiving unit to be turned on when the M-th service channel is received.

11. The system of claim 10, further comprising a timer for operating when the K-th service channel is received.

12. The system of claim 11, wherein the control unit collects, using the timer, Packet Identifier (PID) information of the service channels and a PID receiving time of each PID information, wherein the service channels are after the K-th service channel and before the next K-th service channel, and determines a transmission order of the N service channels by using the PID information and the PID receiving time.

13. The system of claim 12, wherein the control unit determines the order of the M-th service channel from the K-th service channel by comparing the PID information of the M-th service channel with the PID information of other service channels.

14. The system of claim 13, wherein the control unit acquires a PID receiving time of the M-th service channel from the K-th service channel by comparing the PID information of the M-th service channel with the PID information and the PID receiving time of other service channels.

15. The system of claim 14, wherein the control unit initializes the timer when information of the K-th service channel is received and acquires a receiving time of the M-th service channel to be received after channel switching is request, by comparing a time of the timer when the channel switching is requested with the PID receiving time of the M-th service channel.

16. The system of claim 15, wherein the control unit acquires Δt time for a single transmission of the N service channels from additive information included in the service channels, acquires a burst maximum value of each service channel from the additive information and calculates an expected standby time for turning on the broadcast receiving unit by subtracting time information when the channel switching is requested and time information corresponding to the burst maximum value of the N-th service channel after the M-th service channel from the Δt time.

17. The system of claim 16, wherein the control unit initializes the timer at every Δt time of the K-th service channel before the channel switching is requested.

18. The system of claim 16, wherein the control unit compares the expected standby time with a turning on time of the broadcast receiving unit and controls the broadcast receiving unit to be turned on after the expected standby time, if the expected standby time is greater than the turning on time of the broadcast receiving unit.

19. The system of claim 16, wherein the control unit compares the expected standby time with a turning on time of the broadcast receiving unit and controls the broadcast receiving unit to be turned on when the M-th service channel is received, if the expected standby time is smaller than the turning on time of the broadcast receiving unit.

* * * * *